US012557787B1

(12) United States Patent
Landers

(10) Patent No.: US 12,557,787 B1
(45) Date of Patent: Feb. 24, 2026

(54) WIRELESS LOCATION ASSISTED ZONE GUIDANCE SYSTEM PREDICTIVE RAMPED STIMULATION

(71) Applicant: GPSIP, INC., Oshkosh, WI (US)

(72) Inventor: Rodney P. Landers, Stillwater, MN (US)

( * ) Notice: Subject to any disclaimer, the term of this patent is extended or adjusted under 35 U.S.C. 154(b) by 71 days.

(21) Appl. No.: 18/589,416

(22) Filed: Feb. 27, 2024

Related U.S. Application Data

(60) Provisional application No. 63/487,242, filed on Feb. 27, 2023.

(51) Int. Cl.
| | |
|---|---|
| *A01K 15/02* | (2006.01) |
| *A01K 11/00* | (2006.01) |
| A01K 27/00 | (2006.01) |

(52) U.S. Cl.
CPC .......... *A01K 15/023* (2013.01); *A01K 11/008* (2013.01); *A01K 27/009* (2013.01)

(58) Field of Classification Search
CPC ...... A01K 15/00; A01K 15/02; A01K 15/023; A01K 15/04; A01K 27/001; A01K 27/009; H04W 4/021; H04W 4/029; G01S 5/0294
See application file for complete search history.

(56) References Cited

U.S. PATENT DOCUMENTS

| | | | |
|---|---|---|---|
| 2,883,255 | A | 4/1959 | Anderson |
| 3,534,337 | A | 10/1970 | Martin et al. |

| | | | |
|---|---|---|---|
| 4,393,448 | A | 7/1983 | Dunn et al. |
| 4,590,569 | A | 5/1986 | Rogoff et al. |
| 4,611,209 | A | 9/1986 | Lemelson et al. |
| 4,817,000 | A | 3/1989 | Eberhardt |

(Continued)

FOREIGN PATENT DOCUMENTS

| | | |
|---|---|---|
| DE | 2020/04011942 U1 | 12/2004 |
| WO | WO 9427268 A1 | 11/1994 |

(Continued)

OTHER PUBLICATIONS

"Global Pet Finder GPS Pet Tracker", http://www.amazon.com/Global-Pet-Finder-GPS-Tracker/, Nov. 19, 2013, 5 pages.

(Continued)

*Primary Examiner* — Benyam Haile
(74) *Attorney, Agent, or Firm* — Albert W. Watkins

(57) ABSTRACT

A zone-based guidance system provides stimulation indicative of a wayward dog being in an assisted guidance region other than a safe zone. If the dog remains in the same assisted guidance region other than a safe zone and is determined thereby to potentially being non-responsive to the alerts and warnings, the dog's intentions are predicted based upon some combination of instantaneous movement, biometrics, and immediately previous travel. Positive feedback, or in some alternative embodiments at least more positive feedback, is provided when the dog is moving or predicted to be moving in a direction toward the safe zone. If instead the dog movement is determined or predicted to be away from the safe zone, feedback will be delivered that is discouraging, or less-positive. If movement is determined or predicted that isn't getting closer or further away, the amplitude or strength of the stimulation may be increased in a time-dependent manner.

4 Claims, 4 Drawing Sheets

(56) References Cited

U.S. PATENT DOCUMENTS

| | | | |
|---|---|---|---|
| 4,823,366 A | 4/1989 | Williams |
| 4,898,120 A | 2/1990 | Brose |
| 4,965,568 A | 10/1990 | Atalla et al. |
| 4,967,696 A | 11/1990 | Tobias |
| 4,999,782 A | 3/1991 | BeVan |
| 5,043,736 A | 8/1991 | Darnell et al. |
| 5,046,453 A | 9/1991 | Vinci |
| 5,067,441 A | 11/1991 | Weinstein |
| 5,132,871 A | 7/1992 | Densham et al. |
| 5,191,341 A | 3/1993 | Gouard et al. |
| 5,351,059 A | 9/1994 | Tsuyuki |
| 5,351,653 A | 10/1994 | Marischen et al. |
| 5,353,744 A | 10/1994 | Custer |
| 5,355,140 A | 10/1994 | Slavin et al. |
| 5,355,511 A | 10/1994 | Hatano et al. |
| 5,381,129 A | 1/1995 | Boardman |
| 5,389,934 A | 2/1995 | Kass |
| 5,408,956 A | 4/1995 | Quigley |
| 5,445,178 A | 8/1995 | Feuer |
| 5,450,329 A | 9/1995 | Tanner |
| 5,491,486 A | 2/1996 | Welles, II et al. |
| 5,533,959 A | 7/1996 | Newman et al. |
| 5,549,412 A | 8/1996 | Malone |
| 5,568,119 A | 10/1996 | Schipper et al. |
| 5,587,904 A | 12/1996 | Ben-Yair et al. |
| 5,594,425 A | 1/1997 | Ladner et al. |
| 5,614,670 A | 3/1997 | Nazarian et al. |
| 5,636,597 A | 6/1997 | Van Curen et al. |
| 5,669,061 A | 9/1997 | Schipper |
| 5,685,786 A | 11/1997 | Dudley |
| 5,687,093 A | 11/1997 | Long et al. |
| 5,719,771 A | 2/1998 | Buck et al. |
| 5,721,685 A | 2/1998 | Holland et al. |
| 5,742,233 A | 4/1998 | Hoffman et al. |
| 5,751,612 A | 5/1998 | Donovan et al. |
| 5,774,876 A | 6/1998 | Woolley et al. |
| 5,777,451 A | 7/1998 | Kobayashi et al. |
| 5,791,294 A | 8/1998 | Manning |
| 5,804,810 A | 9/1998 | Woolley et al. |
| 5,815,077 A | 9/1998 | Christiansen |
| 5,825,283 A | 10/1998 | Camhi |
| 5,857,433 A | 1/1999 | Files |
| 5,868,100 A | 2/1999 | Marsh |
| 5,870,741 A | 2/1999 | Kawabe et al. |
| 5,875,183 A | 2/1999 | Nitadori |
| 5,892,454 A | 4/1999 | Schipper et al. |
| 5,900,736 A | 5/1999 | Sovik et al. |
| 5,905,461 A | 5/1999 | Neher |
| 5,911,199 A | 6/1999 | Farkas et al. |
| 5,933,079 A | 8/1999 | Frink |
| 5,947,636 A | 9/1999 | Mara |
| 5,949,350 A | 9/1999 | Girard et al. |
| 5,952,561 A | 9/1999 | Jaselskis et al. |
| 5,959,568 A | 9/1999 | Woolley |
| 5,959,577 A | 9/1999 | Fan et al. |
| 5,963,130 A | 10/1999 | Schlager et al. |
| 5,978,749 A | 11/1999 | Likins, Jr. et al. |
| 5,982,291 A | 11/1999 | Williams et al. |
| 5,986,604 A | 11/1999 | Nichols et al. |
| 6,016,713 A | 1/2000 | Hale |
| 6,041,582 A | 3/2000 | Tiede et al. |
| 6,043,747 A | 3/2000 | Altenhofen |
| 6,043,748 A | 3/2000 | Touchton et al. |
| 6,072,396 A | 6/2000 | Gaukel |
| 6,079,367 A | 6/2000 | Stapelfeld et al. |
| 6,100,806 A | 8/2000 | Gaukel |
| 6,114,957 A | 9/2000 | Westrick et al. |
| 6,122,601 A | 9/2000 | Swanson et al. |
| 6,172,640 B1 | 1/2001 | Durst et al. |
| 6,173,321 B1 | 1/2001 | Peterson et al. |
| 6,184,790 B1 | 2/2001 | Gerig |
| 6,225,890 B1 | 5/2001 | Murphy |
| 6,230,661 B1 | 5/2001 | Yarnall, Jr. et al. |
| 6,232,874 B1 | 5/2001 | Murphy |
| 6,232,880 B1 | 5/2001 | Anderson et al. |
| 6,232,916 B1 | 5/2001 | Grillo et al. |
| 6,236,358 B1 | 5/2001 | Durst et al. |
| 6,239,700 B1 | 5/2001 | Hoffman et al. |
| 6,263,836 B1 | 7/2001 | Hollis |
| 6,271,757 B1 | 8/2001 | Touchton et al. |
| 6,292,725 B1 | 9/2001 | Kageyama et al. |
| 6,301,551 B1 | 10/2001 | Piscalko et al. |
| 6,311,644 B1 | 11/2001 | Pugh |
| 6,313,791 B1 | 11/2001 | Klanke |
| 6,320,933 B1 | 11/2001 | Grodzins et al. |
| 6,353,390 B1 | 3/2002 | Beri et al. |
| 6,362,778 B2 | 3/2002 | Neher |
| 6,388,612 B1 | 5/2002 | Neher |
| 6,404,338 B1 | 6/2002 | Koslar |
| 6,415,742 B1 | 7/2002 | Lee et al. |
| 6,421,001 B1 | 7/2002 | Durst et al. |
| 6,421,608 B1 | 7/2002 | Motoyama et al. |
| 6,431,122 B1 | 8/2002 | Westrick et al. |
| 6,434,372 B1 | 8/2002 | Neagley et al. |
| 6,437,743 B1 | 8/2002 | Mintz et al. |
| 6,441,778 B1 | 8/2002 | Durst et al. |
| 6,480,147 B2 | 11/2002 | Durst et al. |
| 6,484,079 B2 | 11/2002 | Buckelew et al. |
| 6,487,992 B1 | 12/2002 | Hollis |
| 6,497,153 B1 | 12/2002 | Hoskinson et al. |
| 6,518,919 B1 | 2/2003 | Durst et al. |
| 6,519,530 B2 | 2/2003 | Crockett et al. |
| 6,520,715 B1 | 2/2003 | Smith |
| 6,561,137 B2 | 5/2003 | Oakman |
| 6,577,141 B2 | 6/2003 | Gandrud |
| 6,581,546 B1 | 6/2003 | Dalland et al. |
| 6,600,422 B2 | 7/2003 | Barry et al. |
| 6,624,754 B1 | 9/2003 | Hoffman et al. |
| 6,657,544 B2 | 12/2003 | Barry et al. |
| 6,700,492 B2 | 3/2004 | Touchton et al. |
| 6,700,533 B1 | 3/2004 | Werb et al. |
| 6,711,535 B2 | 3/2004 | Ford et al. |
| 6,718,248 B2 | 4/2004 | Lu et al. |
| 6,747,555 B2 | 6/2004 | Fellenstein et al. |
| 6,748,902 B1 | 6/2004 | Boesch et al. |
| 6,762,684 B1 | 7/2004 | Camhi |
| 6,838,991 B2 | 1/2005 | Frankewich, Jr. |
| 6,847,892 B2 | 1/2005 | Zhou et al. |
| 6,857,016 B1 | 2/2005 | Motoyama et al. |
| 6,859,171 B2 | 2/2005 | Durst et al. |
| 6,868,100 B2 | 3/2005 | Larson et al. |
| 6,892,131 B2 | 5/2005 | Coffee et al. |
| 6,903,682 B1 | 6/2005 | Maddox |
| 6,915,216 B2 | 7/2005 | Troxler et al. |
| 6,919,803 B2 | 7/2005 | Breed |
| 6,923,146 B2 | 8/2005 | Kobitz et al. |
| 6,943,701 B2 | 9/2005 | Zeineh |
| 6,961,659 B2 | 11/2005 | Motoyama et al. |
| RE38,910 E | 12/2005 | Troxler et al. |
| 6,995,667 B2 | 2/2006 | He et al. |
| 7,000,570 B2 | 2/2006 | Napolez et al. |
| 7,002,472 B2 | 2/2006 | Stratmoen et al. |
| 7,015,817 B2 | 3/2006 | Copley et al. |
| 7,034,683 B2 | 4/2006 | Ghazarian |
| 7,034,695 B2 | 4/2006 | Troxler |
| 7,038,590 B2 | 5/2006 | Hoffman et al. |
| 7,061,385 B2 | 6/2006 | Fong et al. |
| 7,113,126 B2 | 9/2006 | Durst et al. |
| 7,142,167 B2 | 11/2006 | Rochelle et al. |
| 7,164,354 B1 | 1/2007 | Panzer |
| 7,164,986 B2 | 1/2007 | Humphries et al. |
| 7,171,187 B2 | 1/2007 | Haave et al. |
| 7,173,535 B2 | 2/2007 | Bach et al. |
| 7,196,621 B2 | 3/2007 | Kochis |
| 7,219,024 B2 | 5/2007 | Gamache et al. |
| 7,236,798 B2 | 6/2007 | Beuck |
| 7,239,150 B2 | 7/2007 | Troxler et al. |
| 7,259,718 B2 | 8/2007 | Patterson et al. |
| 7,313,759 B2 | 12/2007 | Sinisi |
| 7,319,397 B2 | 1/2008 | Chung et al. |
| RE40,073 E | 2/2008 | Breed |
| 7,328,671 B2 | 2/2008 | Kates |
| 7,345,588 B2 | 3/2008 | Gerig |
| 7,376,457 B2 | 5/2008 | Ross |

(56)     References Cited

U.S. PATENT DOCUMENTS

| | | | |
|---|---|---|---|
| 7,376,530 B2 | 5/2008 | Bienvenu et al. | |
| 7,385,499 B2 | 6/2008 | Horton et al. | |
| 7,394,390 B2 | 7/2008 | Gerig | |
| 7,441,516 B2 | 10/2008 | Sharpe | |
| 7,468,659 B2 | 12/2008 | Haave et al. | |
| 7,477,155 B2 | 1/2009 | Bach et al. | |
| 7,512,493 B2 | 3/2009 | Morgan et al. | |
| 7,518,522 B2 | 4/2009 | So | |
| 7,538,679 B2 | 5/2009 | Shanks | |
| 7,554,441 B2 | 6/2009 | Viegers et al. | |
| 7,663,502 B2 | 2/2010 | Breed | |
| 7,664,483 B2 | 2/2010 | Annoni et al. | |
| 7,677,204 B1 | 3/2010 | James | |
| 7,707,085 B2 | 4/2010 | Sakurai et al. | |
| 7,764,228 B2 | 7/2010 | Durst et al. | |
| 7,786,876 B2 | 8/2010 | Troxler | |
| 7,801,506 B2 | 9/2010 | Haave et al. | |
| 7,822,817 B2 | 10/2010 | Motoyama et al. | |
| 7,830,257 B2 | 11/2010 | Hassell | |
| 7,848,905 B2 | 12/2010 | Troxler et al. | |
| 7,856,947 B2 | 12/2010 | Giunta | |
| 7,920,066 B2 | 4/2011 | Troxler | |
| 7,955,513 B2 | 6/2011 | Carr | |
| 7,961,094 B2 | 6/2011 | Breed | |
| 8,065,074 B1 | 11/2011 | Liccardo | |
| 8,112,242 B2 | 2/2012 | Troxler | |
| 8,115,642 B2 | 2/2012 | Thompson et al. | |
| 8,149,110 B2 | 4/2012 | Troxler | |
| 8,155,871 B2 | 4/2012 | Lohi et al. | |
| 8,159,338 B2 | 4/2012 | Breed | |
| 8,237,575 B2 | 8/2012 | Maclean, III et al. | |
| 8,274,396 B2 | 9/2012 | Gurley et al. | |
| 8,291,867 B2 | 10/2012 | Blizzard | |
| 8,297,233 B2 | 10/2012 | Rich et al. | |
| 8,428,913 B2 | 4/2013 | Troxler | |
| 8,531,289 B2 | 9/2013 | Scalisi et al. | |
| 8,571,671 B2 | 10/2013 | Shah et al. | |
| 8,624,723 B2 | 1/2014 | Troxler | |
| 8,726,846 B2 | 5/2014 | Dutcher et al. | |
| 8,726,847 B2 | 5/2014 | Gurley et al. | |
| 8,757,098 B2 | 6/2014 | So et al. | |
| 8,779,925 B2 | 7/2014 | Rich et al. | |
| 8,797,141 B2 | 8/2014 | Best et al. | |
| 8,838,260 B2 | 9/2014 | Pachet et al. | |
| 8,839,744 B1 | 9/2014 | Bianchi et al. | |
| 8,851,019 B2 | 10/2014 | Jesurum | |
| 8,955,462 B1 | 2/2015 | Golden | |
| 8,957,812 B1 | 2/2015 | Hill et al. | |
| 9,015,231 B1 | 4/2015 | Hodgman et al. | |
| 9,072,278 B2 | 7/2015 | Chortyk-White et al. | |
| 9,101,113 B2 | 8/2015 | Rich et al. | |
| 9,137,971 B2 | 9/2015 | Gurley et al. | |
| 9,161,515 B2 | 10/2015 | Dutcher et al. | |
| 9,226,479 B2 | 1/2016 | Bianchi et al. | |
| 9,265,015 B2 | 2/2016 | Aiuto et al. | |
| 9,326,486 B2 | 5/2016 | Namm | |
| 9,332,734 B1 | 5/2016 | Hege | |
| 9,439,396 B2 | 9/2016 | Namm | |
| 9,538,329 B1 | 1/2017 | Vivathana | |
| 9,552,736 B2 | 1/2017 | Taveira | |
| 9,615,545 B2 | 4/2017 | Rich et al. | |
| 9,640,079 B1 | 5/2017 | Moravek et al. | |
| 9,648,849 B1 | 5/2017 | Vivathana | |
| 9,654,925 B1 | 5/2017 | Solinsky et al. | |
| 9,674,684 B1 | 6/2017 | Mendelson | |
| 9,728,089 B2 | 8/2017 | Marcus | |
| 9,795,118 B2 | 10/2017 | Landers et al. | |
| 9,848,295 B1 | 12/2017 | Mason et al. | |
| 9,922,522 B2 | 3/2018 | Solinsky et al. | |
| 9,924,314 B2 | 3/2018 | Solinsky et al. | |
| 9,961,884 B1 | 5/2018 | Landers et al. | |
| 10,064,390 B1 | 9/2018 | Landers et al. | |
| 10,080,346 B2 | 9/2018 | Landers et al. | |
| 10,092,203 B2 | 10/2018 | Mirov | |
| 10,154,651 B2 | 12/2018 | Goetzl et al. | |
| 10,165,755 B1 | 1/2019 | Landers et al. | |
| 10,165,756 B1 | 1/2019 | Landers et al. | |
| 10,172,325 B1 | 1/2019 | Landers et al. | |
| 10,182,964 B2 | 1/2019 | Snow | |
| 10,231,440 B2 | 3/2019 | Seltzer et al. | |
| 10,251,371 B1 | 4/2019 | Landers et al. | |
| 10,268,220 B2 | 4/2019 | McFarland et al. | |
| 10,292,365 B1 | 5/2019 | Landers et al. | |
| 10,342,218 B1 * | 7/2019 | Landers ............... A01K 15/029 |
| 10,405,520 B2 | 9/2019 | Landers et al. | |
| 10,455,810 B1 | 10/2019 | Landers et al. | |
| 10,470,437 B1 | 11/2019 | Landers et al. | |
| 10,514,439 B2 | 12/2019 | Seltzer | |
| 10,624,319 B2 | 4/2020 | Landers et al. | |
| 10,645,908 B2 | 5/2020 | Seltzer et al. | |
| 10,674,709 B2 | 6/2020 | Goetzl et al. | |
| 10,820,575 B2 | 11/2020 | Landers et al. | |
| 10,842,128 B2 | 11/2020 | McFarland | |
| 10,893,662 B1 | 1/2021 | Landers et al. | |
| 10,918,087 B2 | 2/2021 | Respass et al. | |
| 10,986,813 B2 | 4/2021 | Seltzer et al. | |
| 11,019,807 B1 | 6/2021 | Landers et al. | |
| 11,109,182 B2 | 8/2021 | Floyd et al. | |
| 11,238,889 B2 | 2/2022 | Seltzer et al. | |
| 11,246,291 B1 | 2/2022 | Landers et al. | |
| 11,330,803 B2 | 5/2022 | Ehrman et al. | |
| 11,372,077 B2 | 6/2022 | Seltzer et al. | |
| 11,394,196 B2 | 7/2022 | Olszyk et al. | |
| 11,470,814 B2 | 10/2022 | Goetzl et al. | |
| 11,490,597 B2 | 11/2022 | Seltzer et al. | |
| 11,516,994 B1 | 12/2022 | Landers | |
| 11,553,692 B2 | 1/2023 | Goetzl et al. | |
| 12,004,485 B1 | 6/2024 | Landers et al. | |
| 2001/0026240 A1 | 10/2001 | Neher | |
| 2002/0015354 A1 | 2/2002 | Buckelew | |
| 2002/0017995 A1 | 2/2002 | Touchton | |
| 2002/0152028 A1 | 10/2002 | Motoyama et al. | |
| 2002/0180618 A1 | 12/2002 | Beri et al. | |
| 2002/0196151 A1 | 12/2002 | Troxler | |
| 2003/0179140 A1 | 9/2003 | Patterson et al. | |
| 2003/0184450 A1 | 10/2003 | Muller et al. | |
| 2003/0224772 A1 | 12/2003 | Patzer et al. | |
| 2004/0036649 A1 | 2/2004 | Yaylor | |
| 2004/0108939 A1 | 6/2004 | Giunta | |
| 2004/0196182 A1 | 10/2004 | Unnold | |
| 2005/0034683 A1 | 2/2005 | Giunta | |
| 2005/0035865 A1 | 2/2005 | Brennan et al. | |
| 2005/0066912 A1 | 3/2005 | Korbitz et al. | |
| 2005/0143909 A1 | 6/2005 | Orwant | |
| 2005/0280546 A1 | 12/2005 | Ganley et al. | |
| 2006/0027185 A1 | 2/2006 | Troxler | |
| 2006/0061469 A1 | 3/2006 | Jaeger et al. | |
| 2006/0112901 A1 | 6/2006 | Gomez | |
| 2006/0191491 A1 | 8/2006 | Nottingham et al. | |
| 2006/0197672 A1 | 9/2006 | Talamas, Jr. et al. | |
| 2007/0171047 A1 | 7/2007 | Goodman et al. | |
| 2007/0204804 A1 | 9/2007 | Swanson et al. | |
| 2007/0219705 A1 | 9/2007 | Bitar et al. | |
| 2007/0229350 A1 | 10/2007 | Scalisi et al. | |
| 2008/0036594 A1 | 2/2008 | Kates | |
| 2008/0036610 A1 | 2/2008 | Hokuf et al. | |
| 2008/0055154 A1 | 3/2008 | Martucci et al. | |
| 2008/0156277 A1 | 7/2008 | Mainini et al. | |
| 2008/0162034 A1 | 7/2008 | Breen | |
| 2008/0186167 A1 | 8/2008 | Ramachandra | |
| 2008/0186197 A1 | 8/2008 | Rochelle et al. | |
| 2008/0216766 A1 | 9/2008 | Martin et al. | |
| 2008/0246656 A1 | 10/2008 | Ghazarian | |
| 2008/0252527 A1 | 10/2008 | Garcia | |
| 2008/0278309 A1 | 11/2008 | Troxler | |
| 2009/0002188 A1 | 1/2009 | Greenberg | |
| 2009/0102668 A1 | 4/2009 | Thompson et al. | |
| 2009/0267832 A1 | 10/2009 | Hymel | |
| 2009/0289844 A1 | 11/2009 | Palsgrove et al. | |
| 2009/0292426 A1 | 11/2009 | Nelson et al. | |
| 2009/0325594 A1 | 12/2009 | Lan et al. | |
| 2010/0033339 A1 | 2/2010 | Gurley et al. | |
| 2010/0139576 A1 | 6/2010 | Kim et al. | |
| 2011/0148634 A1 | 6/2011 | Putz | |

(56) References Cited

U.S. PATENT DOCUMENTS

| | | |
|---|---|---|
| 2011/0163873 A1 | 7/2011 | McIntosh |
| 2011/0172916 A1 | 7/2011 | Pakzad et al. |
| 2011/0187537 A1 | 8/2011 | Touchton et al. |
| 2011/0193706 A1 | 8/2011 | Dickerson |
| 2011/0193717 A1 | 8/2011 | Troxler |
| 2011/0298615 A1 | 12/2011 | Rich et al. |
| 2012/0000431 A1 | 1/2012 | Khoshkish |
| 2012/0132151 A1 | 5/2012 | Touchton et al. |
| 2012/0154154 A1 | 6/2012 | Troxler |
| 2012/0220314 A1 | 8/2012 | Altman et al. |
| 2012/0312250 A1 | 12/2012 | Jesurum |
| 2013/0008391 A1 | 1/2013 | Berntsen |
| 2013/0127658 A1 | 5/2013 | McFarland et al. |
| 2013/0141237 A1 | 6/2013 | Goetzl et al. |
| 2013/0157628 A1 | 6/2013 | Kim et al. |
| 2013/0226511 A1 | 8/2013 | Troxler |
| 2013/0265165 A1 | 10/2013 | So |
| 2013/0307688 A1 | 11/2013 | Hoffman et al. |
| 2013/0324166 A1 | 12/2013 | Mian et al. |
| 2014/0020635 A1 | 1/2014 | Sayers et al. |
| 2014/0104063 A1 | 4/2014 | Troxler |
| 2014/0120943 A1 | 5/2014 | Shima |
| 2014/0230755 A1 | 8/2014 | Trenkle et al. |
| 2014/0232541 A1 | 8/2014 | Trenkle et al. |
| 2014/0251233 A1 | 9/2014 | Bianchi et al. |
| 2014/0290013 A1 | 10/2014 | Eidelman et al. |
| 2014/0302842 A1 | 10/2014 | Lloyd et al. |
| 2015/0016730 A1 | 1/2015 | Miller et al. |
| 2015/0020750 A1 | 1/2015 | Jesurum |
| 2015/0040839 A1 | 2/2015 | Goetzl et al. |
| 2015/0107531 A1 | 4/2015 | Golden |
| 2015/0121535 A1 | 4/2015 | Fiss |
| 2015/0177010 A1 | 6/2015 | Abramson et al. |
| 2015/0216142 A1 | 8/2015 | Landers et al. |
| 2016/0015004 A1 | 1/2016 | Bonge |
| 2016/0021849 A1 | 1/2016 | Loosveld |
| 2016/0022185 A1 | 1/2016 | Agarwal et al. |
| 2016/0026837 A1 | 1/2016 | Good et al. |
| 2016/0135431 A1 | 5/2016 | Sheldon et al. |
| 2016/0189507 A1 | 6/2016 | Rayner |
| 2016/0195602 A1 | 7/2016 | Meadow |
| 2016/0205898 A1 | 7/2016 | Perrine |
| 2016/0371984 A1 | 12/2016 | Macfarlane et al. |
| 2017/0099807 A1 | 4/2017 | Northrop et al. |
| 2017/0156294 A1 | 6/2017 | Landers et al. |
| 2017/0295143 A1 | 10/2017 | Bone et al. |
| 2017/0337826 A1 | 11/2017 | Moran et al. |
| 2017/0372580 A1 | 12/2017 | Vivathana |
| 2017/0372581 A1 | 12/2017 | Solinsky et al. |
| 2017/0374510 A1 | 12/2017 | Solinsky et al. |
| 2018/0055011 A1 | 3/2018 | Landers et al. |
| 2018/0184618 A1 | 7/2018 | Gotts |
| 2019/0021283 A1 | 1/2019 | Landers et al. |
| 2019/0113625 A1 | 4/2019 | Farmer et al. |
| 2019/0120929 A1 | 4/2019 | Meadow |
| 2019/0133084 A1 | 5/2019 | Landers et al. |
| 2019/0141951 A1 | 5/2019 | Coughlan |
| 2019/0141953 A1 | 5/2019 | Landers et al. |
| 2019/0281794 A1 | 9/2019 | Ehrman et al. |
| 2020/0093096 A1 | 3/2020 | Blizzard |
| 2020/0351623 A1 | 11/2020 | Eisner |
| 2021/0045353 A1 | 2/2021 | Ehrman et al. |
| 2021/0080595 A1 | 3/2021 | Landers |
| 2021/0084480 A1 | 3/2021 | Maier et al. |
| 2021/0190503 A1 | 6/2021 | Landers |
| 2022/0066045 A1 | 3/2022 | Farmer et al. |
| 2024/0003690 A1 | 1/2024 | Landers |

FOREIGN PATENT DOCUMENTS

| | | |
|---|---|---|
| WO | WO 2004034351 A2 | 4/2004 |
| WO | WO 2004114238 A2 | 12/2004 |
| WO | WO 2005064358 A1 | 7/2005 |
| WO | WO 2008153998 A1 | 12/2008 |
| WO | WO 2014070924 A1 | 5/2014 |
| WO | WO 2015021116 A1 | 9/2015 |
| WO | WO 2015142962 A1 | 9/2015 |
| WO | WO 2019182919 A1 | 9/2019 |
| WO | WO 2020142089 A1 | 7/2020 |
| WO | WO 2020145941 A1 | 7/2020 |
| WO | WO 2021055883 A2 | 3/2021 |

OTHER PUBLICATIONS

"Tagg-The Pet Tracker Master Kit, White by Snaptracs, Inc.", http://www.amazon.com/TAGG-The-Pet-Tracker-Guard/, Nov. 19, 2013, 5 pages.

"Boundary Plus", http://www.invisiblefence.com/find-the-right-solution/, Jan. 29, 2013, 3 pages,.

"Lookup_table", http://www.Wikipedia.org/wiki/Lookup_table, Feb. 15, 2013, 10 pages.

"SkyFence: Our_Product", http://www.gpspetfence.homestead.com/resources.html, Jan. 29, 2013, 3 pages.

"SkyFence: Purchase", http://www.gpspetfence.homestead.com/Purchase.html, Jan. 29, 2013, 2 pages.

"Tagg: About US", http://www.pettracker.com/about-tagg, Jan. 29, 2013, 1 page.

"Kalman Filter", Wikipedia, https://en.wikipedia.org/wiki/Kalman_filter, Jan. 18, 2016, 37 pages.

Skinner, B. F., "Superstition in the Pigeon", Journal of Experimental Psychology, vol. 38, pp. 168-172, 1948.

* cited by examiner

WIRELESS LOCATION ASSISTED ZONE GUIDANCE SYSTEM PREDICTIVE RAMPED STIMULATION

CROSS REFERENCE TO RELATED APPLICATIONS

The present application claims the benefit of U.S. provisional patent application 63/487,242 filed Feb. 27, 2023 of like title, the teachings and entire contents which are incorporated herein by reference.

BACKGROUND OF THE INVENTION

1. Field of the Invention

This invention pertains generally to condition responsive indicating systems with a radio link and including a personal portable device for tracking location. Condition responsive indicating systems used in combination with the present invention monitor the specific condition of humans or animals, though other animate and inanimate beings and objects may be monitored in alternative manifestations. In one manifestation, a fully self-contained collar, band, or similar accessory monitors the location of a pet such as a dog, and provides a plurality of zones within which well defined and positive stimuli are provided to train the pet to stay within a predetermined area, and to shepherd a wayward pet back to the predetermined area. In preferred manifestations of the present invention, the intensity of a well defined and positive stimulus is increased with either an actual increase in time spent within at least some of the plurality of zones or a predicted increase in time.

2. Description of the Related Art

Dogs are well known as "man's best friend" owing to the many beneficial services that they provide. However, and likely since mankind first befriended dogs, there has existed a need to control the territory that a dog has access to. There are many reasons that motivate this need, many which may be relatively unique to a particular dog or owner, and other reasons that are far more universal.

Controlling the territory of a pet in a simple form can comprise a static structure such as a building or a fence, or a leash or similar restraint that can be attached to a static structure. However, these simple restraints have many well-known limitations, including for exemplary purpose the high cost of a pet-specific fence, unintended escapes with no subsequent tracking of the pet, tangling of a leash, and limited or total lack of utility when traveling to different locations.

In consideration thereof, various artisans have proposed other systems that provide more flexibility and capability, such as buried or above ground transmitter antennas combined with radio collars that detect either the crossing of a buried line, the reception or absence of reception of a signal broadcast by the transmitter antenna, or that perform triangulation or time-of-flight calculations with fixed transmitters. When an undesirable location is detected, the radio collar is then triggered to provide stimulation to the dog. Desirably, the stimulation is mild enough not to harm the dog, and yet is still strong enough to gain the dog's attention and lead to desirable behavior. These systems remove the physical link between a dog and a static structure, meaning the dog will not get tangled in obstacles when moving about. Further, in many configurations the safe area may follow irregular shapes and patterns of land, and so is not limited to a circular pattern limited by a particular radius.

The following patents and published patent applications are believed to be exemplary of the relevant prior art, and the teachings and contents of each are incorporated herein by reference: 4,393,448 by Dunn et al, entitled "Navigational plotting system"; 4,590,569 by Rogoff et al, entitled "Navigation system including an integrated electronic chart display"; 4,611,209 by Lemelson et al, entitled "Navigation warning system and method"; 4,817,000 by Eberhardt, entitled "Automatic guided vehicle system"; 4,999,782 by BeVan, entitled "Fixed curved path waypoint transition for aircraft"; 5,191,341 by Gouard et al, entitled "System for sea navigation or traffic control/assistance"; 5,351,653 by Marischen et al, entitled "Animal training method using positive and negative audio stimuli"; 5,353,744 by Custer, entitled "Animal control apparatus"; 5,355,511 by Hatano et al, entitled "Position monitoring for communicable and uncommunicable mobile stations"; 5,381,129 by Boardman, entitled "Wireless pet containment system"; 5,389,934 by Kass, entitled "Portable locating system"; 5,408,956 by Quigley, entitled "Method and apparatus for controlling animals with electronic fencing"; 5,450,329 by Tanner, entitled "Vehicle location method and system"; 5,568,119 by Schipper et al, entitled "Arrestee monitoring with variable site boundaries"; 5,587,904 by Ben-Yair et al, entitled "Air combat monitoring system and methods and apparatus useful therefor"; 5,594,425 by Ladner et al, entitled "Locator device"; 5,751,612 by Donovan et al, entitled "System and method for accurate and efficient geodetic database retrieval"; 5,791,294 by Manning, entitled "Position and physiological data monitoring and control system for animal herding"; 5,857,433 by Files, entitled "Animal training and tracking device having global positioning satellite unit"; 5,868,100 by Marsh, entitled "Fenceless animal control system using GPS location information"; 5,911,199 by Farkas et al, entitled "Pressure sensitive animal training device"; 5,949,350 by Girard et al, entitled "Location method and apparatus"; 6,043,748 by Touchton et al, entitled "Satellite relay collar and programmable electronic boundary system for the containment of animals"; 6,114,957 by Westrick et al, entitled "Pet locator system"; 6,172,640 by Durst et al, entitled "Pet locator"; 6,232,916 by Grillo et al, entitled "GPS restraint system and method for confining a subject within a defined area"; 6,236,358 by Durst et al, entitled "Mobile object locator"; 6,263,836 by Hollis, entitled "Dog behavior monitoring and training apparatus"; 6,271,757 by Touchton et al, entitled "Satellite animal containment system with programmable Boundaries"; 6,313,791 byKlanke, entitled "Automotive GPS control system"; 6,421,001 by Durst et al, entitled "Object locator"; 6,441,778 by Durst et al, entitled "Pet locator"; 6,480,147 by Durst et al, entitled "Portable position determining device"; 6,487,992 by Hollis, entitled "Dog behavior monitoring and training apparatus"; 6,518,919 by Durst et al, entitled "Mobile object locator"; 6,561,137 by Oakman, entitled "Portable electronic multi-sensory animal containment and tracking device"; 6,581,546 by Dalland et al, entitled "Animal containment system having a dynamically changing perimeter"; 6,700,492 by Touchton et al, entitled "Satellite animal containment system with programmable boundaries"; 6,748,902 by Boesch et al, entitled "System and method for training of animals"; 6,923,146 by Kobitz et al, entitled "Method and apparatus for training and for constraining a subject to a specific area"; 7,259,718 by Patterson et al, entitled "Apparatus and method for keeping pets in a defined boundary having exclusion areas"; 7,328,671 by Kates, entitled "System and method for computer-controlled animal toy"; 7,677,204 by James, entitled "Dog training device"; 8,155,871 by Lohi et al, entitled "Method, device, device arrangement and computer program for tracking a moving object"; 8,115,942 by Thompson et al, entitled "Traveling invisible electronic containment perimeter—method and apparatus"; 8,624,723 by Troxler, entitled "Position and proximity detection systems and methods"; 8,757,098 by So et al, entitled "Remote animal training system using voltage-to-frequency conversion"; 8,797,141 by Best et al, entitled "Reverse RFID location system"; 8,839,744 by Bianchi et al, entitled "Mobile telephone dog training tool and method"; 2007/0204804 by Swanson et al, entitled "GPS pet containment system and method"; 2011/0193706 by Dickerson, entitled "Sensor collar system"; 2012/0000431 by Khoshkish, entitled "Electronic pet containment system"; 2013/0127658 by McFarland et al, entitled "Method and apparatus to determine actionable position and speed in GNSS applications"; and EP 0699330 and WO 94/27268 by Taylor, entitled "GPS Explorer".

As apparent from the foregoing, a number of such systems have been devised in the prior art, though many suffer from a number of deficiencies. One particular limitation of many of the prior art systems is the degree and nature of the stimulation. Most prior art electronic fences and collars have attempted to train an animal using punishment, such as a strong, harmful, and often even necrotizing electric shock, to elicit a desired behavior. As is very well known and established, negative reinforcement is less effective than positive reinforcement or a combination of positive and negative reinforcement. Furthermore, the type of reinforcement can also affect the temperament of the animal. This need for aversive treatment is often believed to be required, at least in part, due to the equally harsh construction of a boundary. The prior art structural fence evolved into an electronic fence that provided a harsh and distinct border which the animal was never supposed to cross. However, the natural instincts of many animals are to wander and explore. This harsh border provides little or no warning to an exploring animal, and, as noted herein below, dependent upon the technology used to implement a system, this border may even move with respect to a fixed land location. The combination of harsh punishment and unpredictable borders can literally destroy the psychological well-being of the animal. Consequently, it is desirable to not only provide consistent behavioral reinforcement, but also to provide that reinforcement in a positive manner.

Another limitation of the prior art is the precision or degree of resolution of the border, and the consistency to which the border can be resolved to that precision. For exemplary and non-limiting purpose, many radio systems are inherently sensitive to Radio Frequency Interference (RFI), ElectroMagnetic Interference (EMI), and signal loss or blocking by static structures such as buildings or hills. Many satellite systems are subjected to similar signal loss or blocking, and are further limited by inherent lack of precision and intentional signal shifting incorporated within the satellite emissions. Such signal interference and lack of precision can lead to inaccurate position determinations that will lead to unpredictable, training-destructive stimulations. In such instances, a prior art collar may become completely nonfunctional. Worse, this loss of function can occur without notice in an erratic manner, possibly causing severe harm to the training of the dog.

Yet another limitation of the prior art systems is the required battery size and expected battery life. Most complex GPS, triangulation, and time-of-flight systems require substantial calculations that must be performed very quickly and frequently, thereby requiring both large batteries and frequent charging, sometimes demanding recharging intervals measured in hours. Limited battery life and excessive battery size both severely limit the applications that are suitable for such systems.

The present applicant has developed a system incorporating a number of techniques that are related to the present invention that are represented in the following granted patents and published applications, the teachings of each which are incorporated herein by reference: U.S. Pat. Nos. 7,677,204; 9,795,118; 9,961,884; 10,064,390; 10,080,346; 10,165,755; 10,165,756; 10,172,325; 10,251,371; 10,292,365; 10,342,218; 10,405,520; 10,455,810; 10,470,437; 10,624,319; 10,820,575; 10,893,662; 11,019,807; 11,246,291; 11,516,994; 11,73,968 2021/0080595; and 2024/0003690. These overcome many of the limitations of the prior art, for exemplary and non-limiting purpose by providing positive and non-necrotic stimulation, improved resolution and consistency, fur detection, and reduced battery consumption, and so are preferred for implementation in combination with the present invention. Nevertheless, the teachings of the present invention will find application with many diverse systems and apparatus of the prior art.

While these aforementioned patents and published applications provide many positive features and benefits, one behavior of an animal such as a dog that can be challenging is when there is something of interest that is more attractive or interesting than any aversion to the warnings that a guidance system might provide. For exemplary and non-limiting purpose, a dog might smell the sent of another dog or different species of animal. This scent may generate sufficient curiosity that the dog might stay within a first alert zone, despite receiving a warning tone or vibration. In these instances, it is desirable to detect that the animal is not responding to the stimulus properly and adjust the behavioral intervention appropriately. Exemplary U.S. patents, the teachings which are incorporated herein by reference, include: 5,067,441 by Weinstein; U.S. Pat. Nos. 6,600,422 and 6,657,544 by Barry et al.; and 10,154,651 by Goetzl et al. These exemplary patents provide much benefit over the previously incorporated prior art. Nevertheless, simply determining that the animal is within an alert, warning, or exclusion zone for a longer period than desired and increasing the degree or changing the type of stimulation can still result in confusing stimulation that can be very adverse to proper training of the animal. This situation arises when the animal is within the zone for too long, but changes course to return to the proper safe or inclusion zone. If the timing of the change of course is just before the collar apparatus determines the dog has remained in the alert, warning, or exclusion zone for a longer period than desired, the dog will still receive the increased negative stimulus, even though the dog has begun the desired return to the safe zone. As can be appreciated, this will cause not only confusion in the dog, it will also very negatively impact the training of the animal. In contrast, a human trainer observing the behavior of the animal would know that the animal had already lost interest in the diversion (scent, other animal, etc) and would see the animal returning. As a result, the human trainer would reward the animal, but instead the prior art collars will deliver adverse stimulation.

As may be apparent, in spite of the enormous advancements and substantial research and development that has been conducted, there still remains a need for an improved behavioral guidance system that provides appropriate stimulation when a dog has remained within an alert, warning, or exclusion zone for a longer period than desired.

Additional patents of varying relevance to the selection of appropriate stimulation, the relevant teachings and contents which are incorporated herein by reference, include: U.S. Pat. No. 4,898,120 by Brose; U.S. Pat. No. 6,079,367 by Stapelffeld et al; U.S. Pat. No. 6,232,880 by Anderson et al; U.S. Pat. No. 6,415,742 by Lee et al; U.S. Pat. No. 6,903,682 by Maddox; U.S. Pat. No. 6,923,146 by Kobitz et al; U.S. Pat. No. 7,034,695 by Troxler; U.S. Pat. No. 8,851,019 by Jesurum; 2004/0108939 by Giunta; 2006/0061469 by Jaeger et al; 2008/0252527 by Garcia; 2010/0139576 and 2013/0157628 by Kim et al.

In addition to the foregoing patents, Webster's New Universal Unabridged Dictionary, Second Edition copyright 1983, is incorporated herein by reference in entirety for the definitions of words and terms used herein.

SUMMARY OF THE INVENTION

Exemplary embodiments of the present invention solve inadequacies of the prior art by providing a wayward dog who has moved outside of an assisted guidance safe region various feedback specifically designed to encourage the dog to promptly return back into a safe zone. This is accomplished in the preferred embodiment by initially providing zone-based stimulation indicative of the wayward dog being in an assisted guidance region other than a safe zone. If the dog remains in the same assisted guidance region other than a safe zone and is determined thereby to potentially being non-responsive to the alerts and warnings, the dog's intentions are predicted based upon some combination of instantaneous movement and immediately previous travel. Positive feedback, or in some alternative embodiments at least more positive feedback, is provided when the dog is moving or predicted to be moving in a direction back toward the safe zone, for exemplary and non-limiting purpose by providing the safe zone stimulus or a similar stimulus such as a rewarding tone or a rewarding recorded voice. If instead the dog movement is determined or predicted to be away from the safe zone, feedback will be delivered that is discouraging, or in some alternative embodiments less-positive. For exemplary and non-limiting purpose, in some embodiments this feedback will comprise the same zone-based stimulation but at greater strength, but in other embodiments this feedback will comprise a different type of stimulation, such as the stimulation type of the next zone farther displaced from the safe zone. If movement is determined or predicted that isn't getting closer or further away, in some embodiments the amplitude or strength of the stimulation will be increased in a time-dependent manner. In this manner, the dog is continually rewarded for movement toward the safe zone, and appropriately alerted for other movement. The dog will thereby be directed back into the safe zone.

OBJECTS OF THE INVENTION

The present invention and the preferred and alternative embodiments have been developed with a number of objectives in mind. While not all of these objectives are found in every embodiment, these objectives nevertheless provide a sense of the general intent and the many possible benefits that are available from embodiments of the present invention.

A first object of the invention is to provide a safe and humane apparatus for modifying the behavior of a pet. From the descriptions provided herein and the teachings incorporated by reference herein above, it will be apparent that the present invention may also be applied in certain instances to humans, livestock or other animals. A second object of the invention is to provide a fully self-contained apparatus that will determine location and provide stimuli based upon that location for extended periods of operation. As a corollary, the fully self-contained apparatus is preferably operational with universally available location systems, including but not limited to satellite GPS, cellular telephone triangulation systems, and radio triangulation system such as Loran, but may alternatively be provided with a custom location system if so desired. By using universally available location systems, there is no limit on the locations where the apparatus may be used. Another object of the present invention is to enable simple and efficient set-up and operation by a person. A further object of the invention is to efficiently and expeditiously train a pet, to significantly reduce training time and increase the effectiveness of the training. As a corollary, embodiments of the present invention will preferably provide the effective animal training while preserving the spirit and positive attitude of the animal. Yet another object of the present invention is to enable a person to set an acceptable area or "safe zone" using only the self-contained apparatus, and to adjust or redefine the area again by simple manipulation of the self-contained apparatus. An additional object of the invention is to enable the self-contained apparatus to automatically generate a number of zones that facilitate positive training and behavior modification, and thereby guide a pet or other living being appropriately. A further object of the invention is to shepherd a wayward dog who has moved outside of a safe assisted guidance region back in using non-aversive stimuli, even when the predetermined area has an unusual geometry. An additional object of the invention is to incorporate a variety of stimuli that access the animal's neurological system through different pathways or channels to better gain the attention of the animal. Yet another object of the present invention is to provide appropriate stimulation when a dog has remained within an alert, warning, or exclusion zone for a longer period than desired. A further object of the invention is to incorporate predictive analysis of the dog's movement to more immediately respond to positive movement.

BRIEF DESCRIPTION OF THE DRAWINGS

The foregoing and other objects, advantages, and novel features of the present invention can be understood and appreciated by reference to the following detailed description of the invention, taken in conjunction with the accompanying drawings, in which.

DESCRIPTION OF THE PREFERRED EMBODIMENT

Manifested in the preferred embodiment, the present invention provides an improved behavioral guidance system that provides appropriate stimulation when a dog has remained within an alert, warning, or exclusion zone for a longer period than desired. For exemplary purposes only, and not limiting the present invention thereto, the boundary of a property has been mapped to include a plurality of guidance zones as described in the commonly owned patents incorporated herein above by reference. The guidance zones, the creation and purpose which are well described in those commonly owned patents, are illustrated herein as being contained within lines enclosing portions of the property. Nevertheless, it will be understood as taught in those commonly owned patents that no such boundary lines exist, and that instead there are a large number of mapped locations, each which contains a guidance zone value as illustrated in FIG. 1 by the values 0-3.

Figure 1:
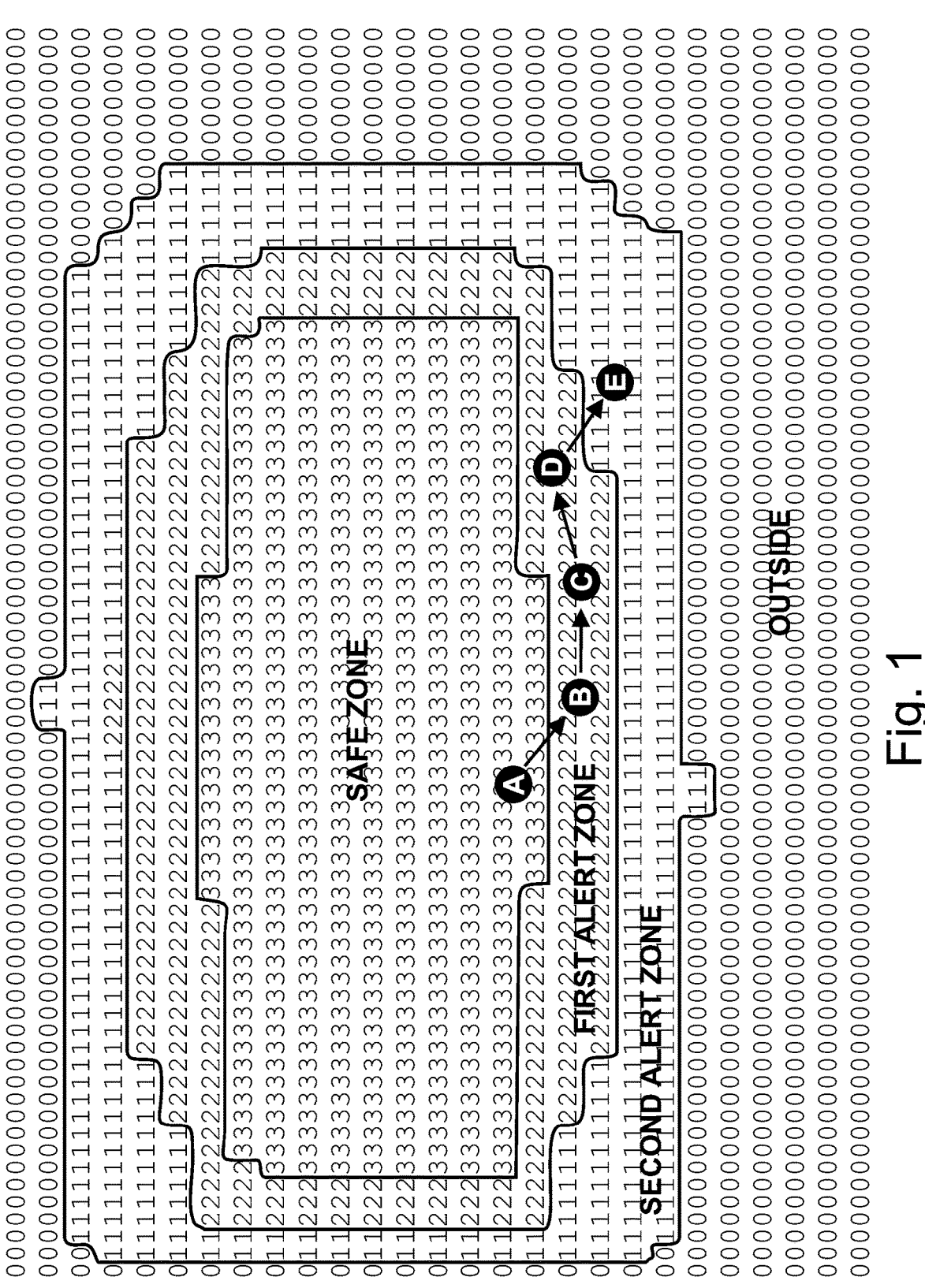
FIG. 1 illustrates a preferred embodiment wireless location assisted zone guidance system having predictive ramped stimulation designed in accord with the teachings of the present invention from simplified schematic view.

To best illustrate a preferred embodiment of the present invention, a travel path for a location training apparatus is illustrated in FIG. 1. Five discrete points along the travel path are labeled, including points A through E. For exemplary purposes only, and not solely limiting the present invention thereto, each of these points A through E will also be understood to be positioned at sequential time intervals. In other words, during a first time interval of a duration T, the location training apparatus will move from position A to position B. During a second time interval of a duration T, the location training apparatus will move from position B to position C. During a third time interval of a duration T, the location training apparatus will move from position C to position D. Finally, during a fourth time interval of a duration T, the location training apparatus will move from position D to position E.

Position A is, for exemplary and non-limiting purpose, located within the safe zone. Within the safe zone, and as well explained in our commonly owned patents, a reward tone or the like is occasionally generated. During the first time interval, the location training apparatus moves from position A to position B. In position B, and again as well explained in our commonly owned patents, a suitable stimulus is generated that alerts a dog, animal, or other animate being bearing the location training apparatus that the location training apparatus has left the safe zone and is now in the first alert zone. This stimulus is provided, in many embodiments, with the intent to train the dog, animal, or other animate being to stay within the safe zone.

With the elapsing of a second time interval of duration T, the location training apparatus will move from position B to position C. Since position C is still within the first alert zone the stimulation type and intensity would not have changed from position B to position C, as described in our commonly owned patents. Similarly, the movement from position C to position D would also not have changed the stimulation type and intensity, again since position D is still within the first alert zone. The next change in stimulation type and intensity would have come when the location training apparatus moved from position D to position E, which includes a change in zone from first alert zone to second alert zone. At position E then, and again as described in our commonly owned patents, a new second alert stimulation of particular type and intensity would be generated.

While this approach in the commonly owned patents works well, the present invention offers expanded and improved training for dogs and other animals and animate beings. In addition to checking the zone value of a current location, in accord with the teachings of the present invention the location training apparatus will also compare the current location zone value with the zone value of the most recent previous location.

If the zone value has changed between the current location zone value and the zone value of the most recent previous location, then as described in our commonly owned patents, a new stimulation of particular type and intensity would be generated. Consequently, there is no change in stimulation type and intensity between the present invention and the commonly owned patents for movement from point A to point B, or for movement from point D to point E.

However, in accord with the teachings of the present invention, if the location training apparatus remains outside of the safe zone and within the same alert or warning zone from one position sampling to a next sampling at some time interval later, the stimulation intensity will be ramped up or increased from the intensity generated at the previous location. In other words, and referring again to FIG. 1, when the second time interval of duration T elapses, the location training apparatus will have moved from position B to position C. Since position C is still within the first alert zone, in accord with the teachings of the present invention the stimulation type will not change from position B to position C. Nevertheless, the intensity of the stimulation provided at position C will be greater than was provided at position B. Similarly, since position D is still within the first alert zone, in accord with the teachings of the present invention the stimulation type will not change from position C to position D. Nevertheless, the intensity of the stimulation provided at position D will be greater than was provided at position C. While two increases in intensity are described and illustrated with movement from position B to position C and again to position D, the number of possible increases and the relative amounts of such increases will in some embodiments be predetermined at design time, and in other embodiments will be user selected or adjusted.

As may be appreciated, the increases in stimulation intensity responsive to increased time within alert and warning zones is applicable not only to the commonly owned patents and published applications incorporated by reference herein above, but also to other location training apparatuses of the prior art. A very important benefit of the present invention is automatic or inherent adjustment to the mental state of a dog or other animate being. For many dogs, the exposure to an external attention-grabbing stimulus such as a squirrel or rabbit will make them less attentive to other environmental stimulants, including those generated by a location training apparatus. In such case, a factory or user-preset stimulation level that would ordinarily garner the dog's attention may go completely unnoticed. By ramping up the stimulation, the stimulation will be provided at the lowest level needed to garner the dog's attention, even if that ramping requires several steps to be noticed.

Nevertheless, one of the many important benefits attained by the commonly owned patents and published applications is the simplification of calculations required for operation, which in turn results in a substantial reduction in power consumption. In the present invention, no further distance calculations are required, nor finer position resolution required. Instead, the total time spent within a particular guidance zone is simply determined by checking whether there has been a guidance zone change, and if not, then based upon increasing time the intensity of stimulation is ramped in accord with factory or user presets. This approach requires almost no processor power, and does not require any increases in RAM or other hardware capability.

In the foregoing description, time is described as one factor for calculating when to determine that the dog is not responding properly to alert or warning stimuli. Preferably, in addition to time, the direction of travel of the dog and discernable intent will also be considered. As soon as the dog starts moving toward the safe zone or exhibits discernable intent thereof, alert and warning stimulation will be discontinued irrespective of time outside of the safe zone.

Figure 2:
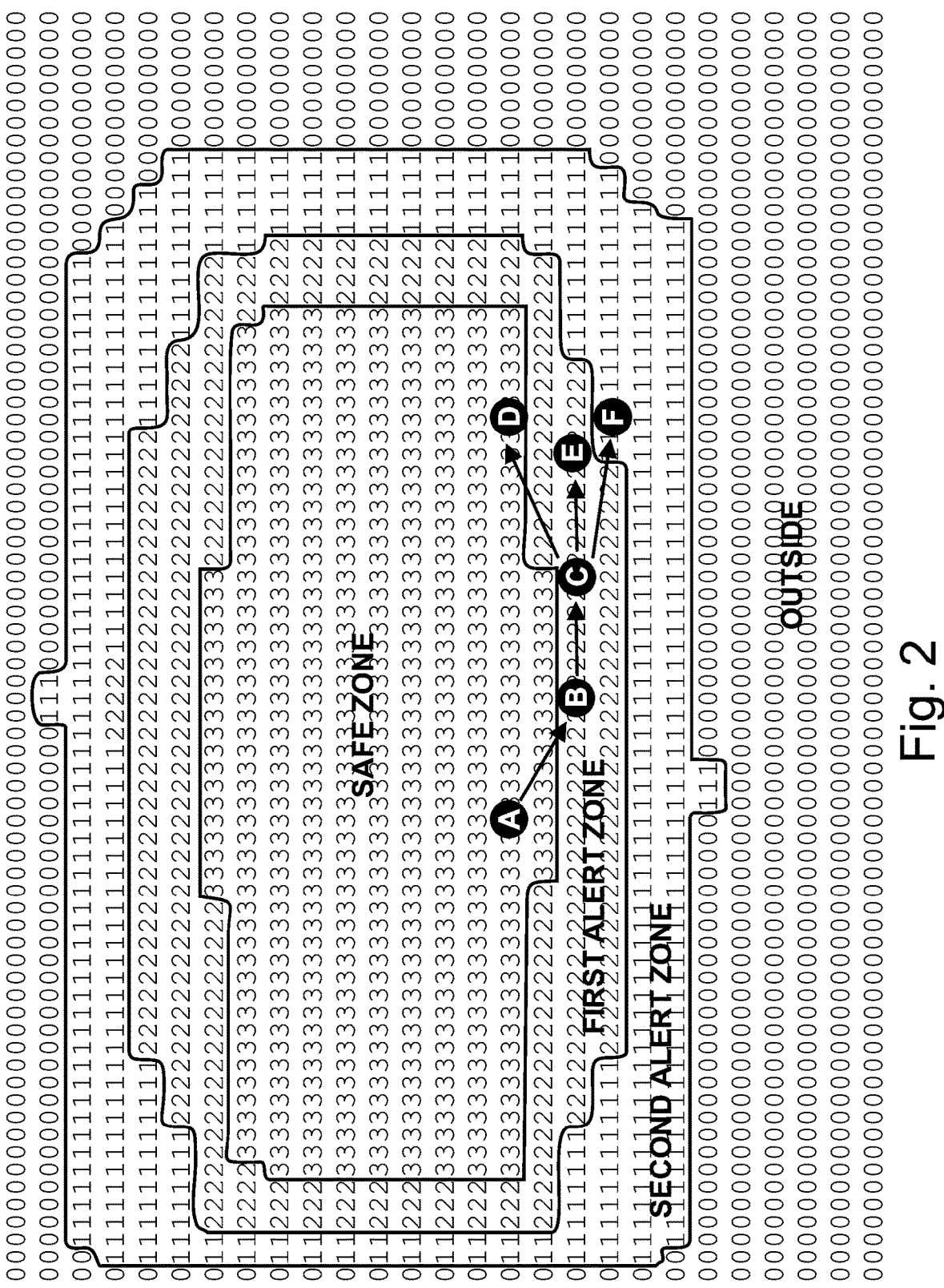
FIG. 2 illustrates the preferred embodiment wireless location assisted zone guidance system having predictive ramped stimulation of FIG. 1, further illustrating the predictive capability, from simplified schematic view.

A predictive capability is illustrated in FIG. 2. To provide this predictive capability, in some embodiments the displacement of the dog will also be calculated by using the difference of the current and previous positions represented in the data table over a time interval. In such case, the most recent past movement from position B to position C is determined to be 7 data points within the data table horizontally to the right, without any vertical change. When this same shift is applied to position C, the next predicted position will be position E. In such case, as visible in FIG. 2 the dog does not appear to be leaving the first alert zone, and the intensity of the stimulation will be increased.

As may be apparent, in order to detect such motion using GPS determination, the dog must move sufficiently to traverse from one resolved GPS position to an adjacent resolved GPS position. The present predictive capability of the present invention is not limited to using the difference of the current and previous positions represented in the data table over a time interval. Instead, other predictive indicators will also most preferably be used and factored into a prediction to improve the accuracy. As noted herein above in the background section, a human trainer will not only be gauging a future position solely by how fast the dog has moved from one point to the next. Instead, the trainer will also look for other visual cues, such as changes in the posture of the dog indicating acceleration or deceleration, and changes in direction that have not registered as positional displacement changes.

To emulate such changes, indicators of directional intent may be used in addition to actual detection of movement towards the safe zone. A loosely coupled inertial navigation system is most preferably incorporated into the collar. Desirably, the accuracy of the GPS determinations may be significantly improved by incorporating a loosely coupled inertial navigation system into the collar. The inertial navigation system may then be used to validate GPS readings, and may also be used to discard outlier position info such as might be produced sporadically. For exemplary purposes, when an inertial system indicates no movement of the dog and a GPS or equivalent determination indicates a sudden multi-meter jump, then the data point indicative of a sudden multi-meter jump can be discarded or ignored. Likewise, tracking movement of the collar in combination with a compass or other heading detection apparatus within the collar may be used to determine what direction of travel is in a forward direction. Dogs do not run backwards. Consequently, if the GPS determination indicates a sudden reversal of direction without an associated reversal of direction by the compass, or other heading detection apparatus then this may also be discarded or ignored.

Accelerometer, biometric and location-based indicators may further be used to control the frequency of GPS position calculation, which in turn is related to the average power consumption and battery life. So, for exemplary purposes, if the collar is in a dwelling, the GPS may be deactivated.

Similarly, if accelerometer and/or biometric indicators suggest that the dog is sleeping, the sampling rate may be substantially less frequent, if at all, until the dog wakes up. Additionally, when the dog is within the safe zone, the sampling rate may also be less frequent.

An inertial system, compass or other heading detection apparatus, or biometric system may also preferably be used to pre-alert dog state and predict sudden location changes. Exemplary biometric indicators might be heart or respiration rates, and an exemplary inertial indicator might be a sudden head lifting or movement.

An important feature of the present invention is the detection of at least one indicator of the direction of travel of the dog, and whether that direction of travel is indicative of progress toward returning to the safe zone. For exemplary purposes only, and not solely limiting the present invention thereto, these indicators will in some embodiments include one or more of the following: sequential GPS position determinations indicating a shift of position toward the safe zone such as described herein above; a compass or other heading detection apparatus indication of a directional shift toward the safe zone; an inertial sensor detecting a direction change toward the safe zone; or other suitable indication of direction. When the dog is outside of the safe zone and the indicator of direction of travel indicates movement toward the safe zone or intent thereof, positive stimulus will most preferably be provided. In the preferred embodiment, this may be a short sounding of the safe zone tone, for exemplary and non-limiting purpose, to reward the animal for indications of movement or intent thereof toward the safe zone. Once back in the safe zone, the dog will again receive positive reinforcement from the safe zone stimulation.

As described above, the displacement from position B to position C is known and is predictive of movement to position E. However, in the event of a compass or other heading detection apparatus change indicating a shift to the left for the dog, or up and thereby toward the safe zone as illustrated in FIG. 2, this indication of a directional change can be used to predict that the next detected location will be position D. In such case, for exemplary and non-limiting purpose a short sounding of the safe zone tone will reward the animal for indications of intent of movement toward the safe zone. If instead the inertial and heading changes suggest both a directional change away from the safe zone and an acceleration to thereby predict position F as the next location, then the stimulation will in some embodiments be shifted immediately to either greater intensity or to the second alert zone stimulation type as determined by either a designer or by user settings.

Figure 3:
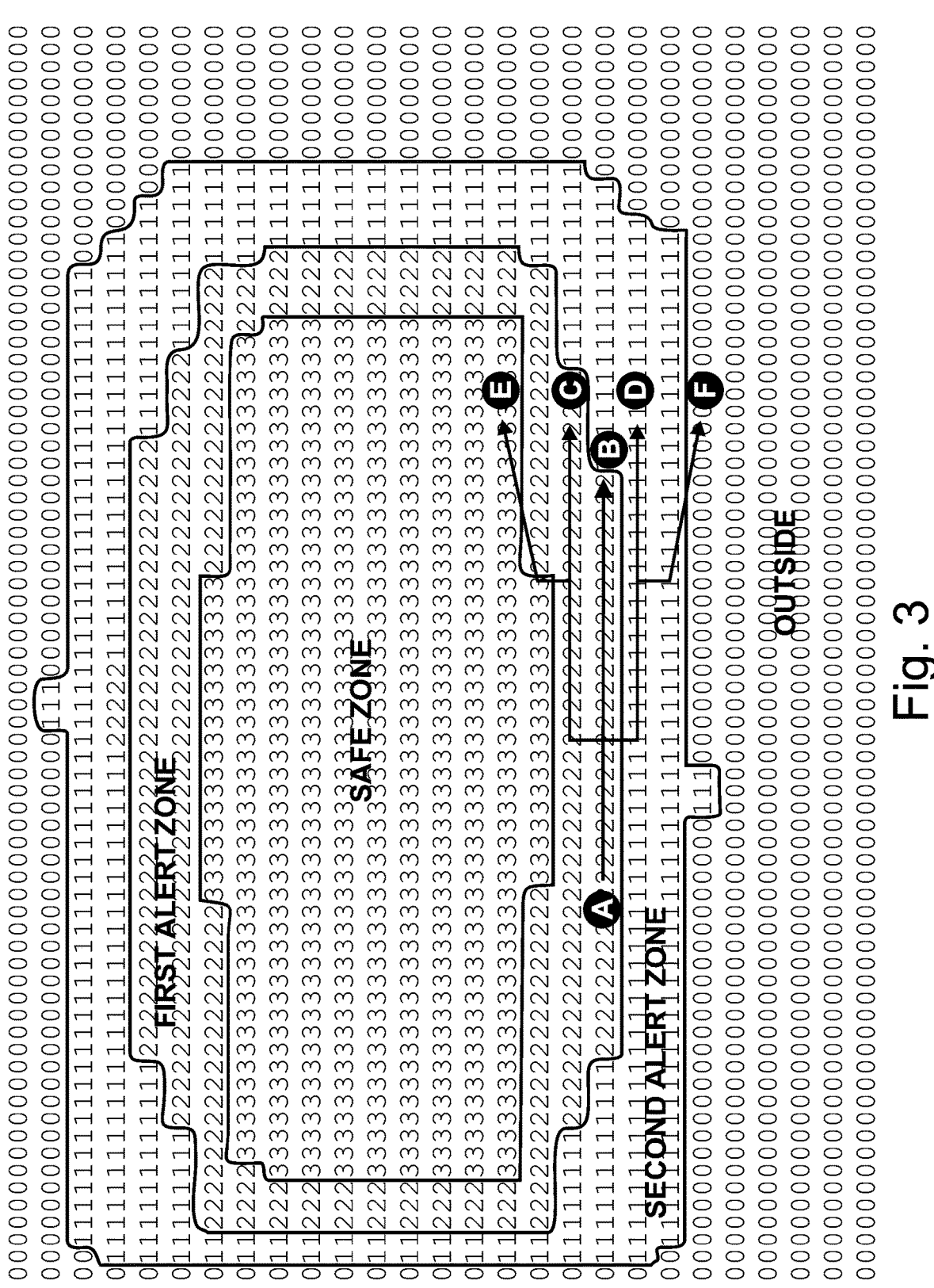
FIG. 3 illustrates the preferred embodiment wireless location assisted zone guidance system having predictive ramped stimulation of FIG. 1, further illustrating the predictive capability, from simplified schematic view similar to FIG. 2.

The predictive capability of FIG. 2 can be expanded upon as illustrated in FIG. 3, where in some embodiments, a different comparison will be performed. The current direction of travel can be used to read the guidance zone value stored in each data point within the data table that will be represented as being traversed by the collar if the direction of travel is maintained constant. In the preferred embodiment, the processor will be checking to see whether any guidance zone values that are closer to the safe zone than the current zone will be traversed. If a guidance zone value closer to the safe zone will be traversed, this indicates that the dog may be trying to return to the safe zone from the current location. This can be particularly useful when the geometry of the zones are very non-linear, or where there are significant land objects that might block the dog from traveling the most direct route.

For exemplary purpose only, and not limiting the present invention thereto, to traverse the data table representing the collar direction of travel, the slope of the line in the direction of travel is used to calculate which data point will next be traversed. For a slope of +1 vertical for every +1 shift horizontally, which we understand to be a 45 degree angle, the processor will then increment from position C one position in the horizontal or X axis, and one position in the vertical or Y axis, read the data contents, and if the contents is the same as the current data table position, then the increments in the X and Y axes are repeated and data table is read again. The path of sequential future position guidance zone values stored in the data table are read, either until a different value is encountered, or until the data table is exhausted, whichever comes first. For exemplary and non-limiting purpose, the path of sequential future position guidance zone values stored in the data table are read sequentially, though in alternative embodiments other techniques to optimize the read sequence will be used as will be described for further exemplary purpose herein below.

In the case of a fractional increment, such as can often occur when the slope of a path is offset from horizontal or vertical in the data table, the processor will keep track of the fractions, but at each data point shift the processor will round the fractions to the closest whole number to determine which data point in the data table to read. In other words, and again for the two X steps for each single Y step, the first step in the X direction would lead to a one-half step in the Y direction. Even though the processor will keep track of the one-half step in the Y direction, using standard rounding rules this will cause the Y axis to increment by one as well for the data table read. Consequently, moving from point C to the next data table read will generate a shift in both the X and Y directions of one. If the value returned from the data table is zero, then the next read will be from a position shifted by one only in the X direction. This is because the processor knows the Y direction shift now totals only one position shifted, and the one-position shift has already been made. This rounding provides an accurate representation of how each new position being traversed will be detected by a position detection system such as GPS.

As alluded to above, in some alternative embodiments not every data point in the path of sequential future position guidance zone values stored in the data table is read. In one alternative embodiment, the simplest fraction representing the slope is used to offset to the next data point to be read. In other words, and again using the above example of two steps in the X direction for each step in the Y direction, rather than reading the next data point in the path that is offset in the X direction by one step, the processor will skip this data point read and proceed directly to the next data point offset, which is two steps in the X direction and one step in the Y direction. This technique eliminates the need for the processor to keep track of rounding values. While this alternative embodiment technique is beneficial for paths that follow a slope intermediate between the X and Y axis, it is nevertheless deficient as the path approaches parallel to one of the axes where a large number of data points might be skipped. Consequently, this approach of avoiding tracking of rounding numbers will preferably be vacated as the slope of the path is at or below a minimal critical angle of offset from parallel with one of the axes.

As also alluded to above, in some alternative embodiments the data points are not read sequentially. Since in the preferred embodiment the one or more alert zone values comprise a width of two data points, in these alternative embodiments every other data point will be read, and the intermediate data point will be skipped. In these alternative embodiments, all paths that would enter the outermost alert zone will still be detected, except for a path that only intersects with the very edge of the outermost alert zone. As may then be appreciated, in some alternative embodiments the number of data points skipped is directly related to the width of the alert zone, such that at least one read will occur within the alert zone. In other words, if the alert zone is three points in width, then in some alternative embodiments two data points will be skipped before the next data point is read. In some further alternative embodiments, the number of data points skipped is directly related to the size of the area circumscribed by the alert zone. In yet further alternative embodiments, both the width of the alert zone and the size of the area circumscribed by the alert zone are factored into the determination of the number of data points skipped.

In a yet further alternative embodiment, a first read of data points might read every nth data point, and, if all of those data point reads return the same guidance zone value, then another set of reads of every nth data point +1 position may be made, until either a value is returned that is not a same guidance zone value or all of the data points have been read. In other words, if the first sequential read of data points reads every third data point starting at data point 1, then the reads would occur at data points 1, 4, 7, 10, etc. If this first sequential read of data points only returns the same guidance zone values as the present location, then a second sequential read of data points will be initiated. This second sequential read of data points will start at data point 2, and continue with data points 5, 8, 11, and so forth. If this second sequential read of data points only returns the same guidance zone values as the present location, then a third sequential read of data points will be initiated. The third sequential read of data points will start at data point 3, and continue with data points 6, 9, 12, and so forth. As may be appreciated, conducting the aforementioned first, second, and third sequential reads of every third data point will result in all data points in the path of sequential future position guidance zone values stored in the data table being read.

In the illustration of FIG. 3 the direction of travel is entirely in the horizontal direction, or along the X axis of the data table, so a simple read of the data in the row occupied by point A is made to see if any of the data points in the table yield a different zone value than that of position A. As the data table is read, when position B is encountered the zone value changes from 2 to 1. Since this is indicative of movement away from the safe zone, and as the zone values farther along the x axis are read there is not subsequently a zone value of 3 indicative of a movement toward the safe zone or at least to a zone closer to the safe zone, then the stimulation will in some embodiments be intensified.

While this reading of the data values along the current path provides some indication of intent, as the distance from the current path increases, the likelihood that the dog will maintain this path decreases. To account for this, in some embodiments an increasing band of uncertainty is applied to a path of sequential future position guidance zone positions. In the illustration of FIG. 3 the direction of travel is entirely in the horizontal direction, or along the X axis of the data table, so a simple read of the data in the row occupied by point A is made to see if any of the data points in the table yield a zone value closer to the safe zone than that of position A. As already described, none do. However, additional data points are preferably read from the table by adding an increasing band of uncertainty as the collar is predicted to travel from point A to point B.

As also illustrated in FIG. 3, the width of the path of sequential future position guidance zone values within the first approximately 10 data points from point A is one data point. At approximately 10 data points from point A, and continuing for another approximately 10 data points, the width of the path of sequential future position guidance zone values is increased from one data point to three data points, thereby allowing for an increased amount of uncertainty as the dog travels farther from point A. This means that the data points from point A to points B, C, and D are checked for any zone value closer to the safe zone than that of position A. At approximately 20 data points from point A, and continuing for another approximately 10 data points, the width of the path of sequential future position guidance zone values is increased from three data points to five data points, thereby allowing for an increased amount of uncertainty as the dog travels even farther from point A. This means that the data points from point A to points B, C, D, E, and F are checked for any zone value closer to the safe zone than that of position A.

In the illustration of FIG. 3, position E is within the safe zone, position C is in the same zone as position A, and positions B, D, and F are all zones farther from the safe zone. In some embodiments, this degree of uncertainty will result in a determination of an inability to accurately predict a future intent. In other embodiments, the number of positions that suggest an intent to move toward the safe zone, or in other words the likelihood that the dog's intent is toward the safe zone, are weighed against the number that do not indicate an intent to move toward the safe zone. In such embodiments, given the positions B-F of FIG. 3, the weighting would suggest a greater likelihood that the dog is headed away from the safe zone. Consequently, in such embodiments, the stimulation intensity would be increased. Nevertheless, and again owing to the uncertainty, the increase in stimulation would be relatively small. In some of these embodiments, the intensity change may further be adjusted based upon the weighted likelihood of intent.

For exemplary purpose only, and not limiting the present invention thereto, particular distances from point A are illustrated in FIG. 3 to increase the width of the path of sequential future position guidance zone values, and the width of the path of sequential future position guidance zone values is increased by a particular number of data points at each of these particular distances. Nevertheless, in accord with the teachings of the present invention, both the particular distances where the width changes and the amount of increase in the path width will be determined either by initial design, by user selection, or by calculations made by the processor based upon a particular geometry of alert zone.

In some embodiments, predictive intent will only be used if the dog remains in the same assisted guidance region other than a safe zone for a longer period than desired and is determined thereby to potentially being non-responsive to the alerts and warnings.

In some embodiments, only one predictive intent calculation type will be used. In some embodiments of the invention, rather than relying on a single predictive intent calculation, two or more of these techniques are used. In such embodiments, priority may be assigned to one particular method over another depending upon training goals and upon which check is returning a result indicating a dog is returning as desired and which is returning a negative result indicating the current path is not returning. In some embodiments, the selection of the type of calculation used is determined by a user selection. In some embodiments, the selection of the type of calculation used is determined by the processor, by checking the geometry of the zones to determine if one predictive intent calculation is anticipated to be of better predictive capability than another.

Figure 4:
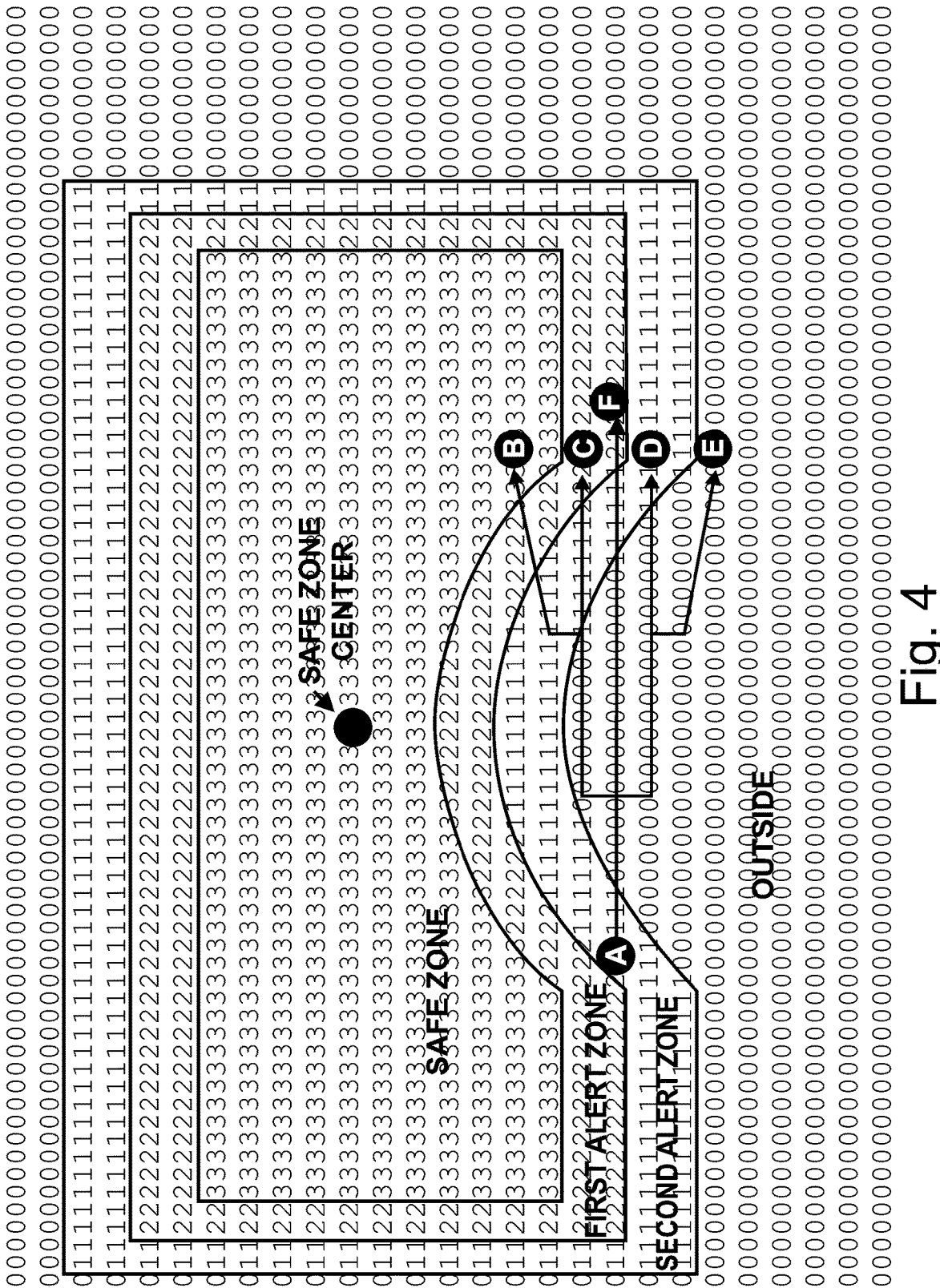
FIG. 4 illustrates the preferred embodiment wireless location assisted zone guidance system having predictive ramped stimulation of FIG. 1, further illustrating the predictive capability, from simplified schematic view similar to FIG. 3 but with a different zone geometry.

The predictive capability of FIG. 3 can be applied to many different zone geometries. FIG. 4 illustrates a concave border, with the dog at point A and heading in the direction of point B. This type of geometry is found commonly in a cul-de-sac, but may be found in other property borders as well. In this illustration, travel from position A to position F using the technique of following the current path across the data table in the manner of a geometric ray will yield a zone value of 2, which is thereby understood to be closer to the safe zone than position A. Using the degree of uncertainty will generate the positions B and C that are also closer to the safe zone, position D is at the same second alert zone, and finally position E is farther from the safe zone. In this case of FIG. 4, this may the result in a determination of an inability to accurately predict a future intent in some embodiments. In other embodiments, the number of positions that suggest an intent to move toward the safe zone are greater than the number that do not indicate an intent to move toward the safe zone. In such embodiments, given the positions B-F of FIG. 4, the weighting would suggest a greater likelihood that the dog is headed toward the safe zone. Consequently, in such embodiments, the stimulation intensity would be decreased. Nevertheless, and again owing to the uncertainty, the decrease in stimulation would be relatively small. In some of these embodiments, the intensity change may further be adjusted based upon the weighted likelihood of intent.

The predictive capability of the present invention and illustrated in the Figures will in some embodiments be further enhanced by the incorporation of a displacement multiplier. The displacement multiplier is used to multiply the predicted distance by a particular amount. In other words, and for exemplary and non-limiting purpose with reference to FIG. 2, the movement from position C to predicted position E is the same approximate seven data points to the right as was the actual displacement from position B to position C. However, there are many situations where a designer or user will prefer to have either more or less travel distance being predicted. Most commonly, in the case of fast moving dogs, short sampling intervals, or both, it will be desirable to look farther ahead than a single sampling interval will provide. In such instances, the multiplier might, again for exemplary and non-limiting purpose, be set to multiply the predicted displacement distance by 1.5 times, shifting position E to the right by another 3.5 data points.

While this example of a 1.5 times multiplier suggests a user-set or designer-determined multiplier, in other embodiments the multiplier will be dynamic. In some embodiments, a current displacement amount from one sampling to the next can be used to adjust the multiplier. In other words, a higher displacement is indicative of higher velocities, and so the multiplier in these embodiments will be dynamically increased. In contrast, a lower displacement would result in a lower multiplier. In other embodiments, an accelerometer is used to detect changes in animal velocity, and those changes are used to similarly adjust the multiplier value.

Noteworthy herein is the understanding that while the diverse neurological stimulus channels of the preferred embodiment help to better communicate with an excited dog, this does not mean that a non-aversive system will have only gentle stimuli. It will be appreciated herein that an excited animal will not sense stimuli as well as a calm animal. In an excited state, many animals have much greater pain thresholds and many will also mute senses that are not a part of the cause of the excited state. In other words, a dog who has smelled a rabbit may not hear or feel ordinary sensations, and will only feel a gentle sensation during the excited state that might, in a calm state, be perceived as aversive. Consequently, the strength or level of the various stimuli may also be designed to factor in the level or expected level of excitation of the animal at the time of stimulation. This may include biometric or inertial sensing as well, such that a dog in the heat of a chase may receive a stronger stimulus than a dog slowly ambling about.

While three zones are illustrated within an assisted guidance region, the present invention is not solely limited to a particular number of zones within an assisted guidance region, or a particular way to represent those zones. The numerical representations from zero to three are preferred, but any other representations that may be machine stored are contemplated herein.

While the foregoing details what is felt to be the preferred embodiment of the invention, no material limitations to the scope of the claimed invention are intended. Further, features and design alternatives that would be obvious to one of ordinary skill in the art are considered to be incorporated herein. The scope of the invention is set forth and particularly described in the claims herein below.

I claim:

1. A wireless location assisted zone guidance system configured to assist in the training and management of an animal using predictive ramped stimulation, comprising:

a housing;

an electrical power source contained within said housing;

at least one animal stimulation apparatus electrically coupled with said housing and powered by said electrical power source;

a wireless location determination apparatus contained within said housing, powered by said electrical power source, and configured to operatively generate current position identifying information representative of a current position of said housing;

an electrical processor coupled to said wireless location determination apparatus and operative to receive said current position identifying information therefrom;

memory electrically accessible by said electrical processor;

a data table that is stored in said electrically accessible memory; and a plurality of guidance zone values stored in said data table, with each guidance zone value stored in said data table identifying at least a one of a safe zone associated with a first behavioral guidance stimulation, an alert zone circumscribing said safe zone associated with a second behavioral guidance stimulation different from said first behavioral guidance stimulation, and an out-of-bounds zone circumscribing said alert zone associated with a third behavioral guidance stimulation different from said first and second behavioral guidance stimulations;

said electrical processor configured to operatively compare said received current position identifying information to said data table to generate a first represented current position within said data table that is in a guidance zone circumscribing said safe zone, to initiate a stimulation by said at least one animal stimulation apparatus based upon a first guidance zone value stored in said data table at said first represented current position, and to generate a second represented current position that is subsequent to said first represented current position and to read a second guidance zone value stored in said data table at said second represented current position and further configured to vary an output of said at least one animal stimulation apparatus responsive to said second guidance zone value relative to said first guidance zone value;

wherein said electrical processor is further configured to receive as an input an electrical signal indicative of a displacement intention and responsive thereto calculate at least one predicted future position, and to read a future guidance zone value stored in said data table at a location representing said predicted future position, and subsequent to said read of said future guidance zone value, said electrical processor is configured to compare said future guidance zone value with said second guidance zone value, and responsive to said compare to determine whether said future guidance zone value equals said second guidance zone value;

wherein said electrical processor is further configured to vary an output of said at least one animal stimulation apparatus from an output representative of said second guidance zone value, said variance of said output of said at least one animal stimulation apparatus responsive to both of said determination whether said future guidance zone value equals said second guidance zone value and said determination whether said second guidance zone value is equal to said first guidance zone value; and wherein said electrical processor is configured to multiply a difference between said calculated at least one predicted future position within said data table and said second represented current position within said data table by a displacement multiplier to thereby shift said calculated at least one predicted future position relative to said second represented current position by said multiplier.

2. The wireless location assisted zone guidance system configured to assist in the training and management of an animal using predictive ramped stimulation of claim 1, wherein said displacement multiplier is dynamically determined.

3. The wireless location assisted zone guidance system configured to assist in the training and management of an animal using predictive ramped stimulation of claim 2, wherein said displacement multiplier is dynamically determined responsive to a magnitude of a data table displacement between said second represented current position and said first represented current position in said data table.

4. The wireless location assisted zone guidance system configured to assist in the training and management of an animal using predictive ramped stimulation of claim 2, wherein said displacement multiplier is dynamically determined responsive to detected changes in animal velocity.

* * * * *